United States Patent
Busch et al.

(10) Patent No.: US 7,167,433 B2
(45) Date of Patent: Jan. 23, 2007

(54) SCANNING APPARATUS FOR FLUORESCENT MULTI-LAYER STORAGE

(75) Inventors: Christopher Busch, Eindhoven (NL); Marcello Leonardo-Mario Balistreri, Eindhoven (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/526,304

(22) PCT Filed: Aug. 22, 2003

(86) PCT No.: PCT/IB03/03757

§ 371 (c)(1),
(2), (4) Date: Mar. 2, 2005

(87) PCT Pub. No.: WO2004/023459

PCT Pub. Date: Mar. 18, 2004

(65) Prior Publication Data

US 2006/0013106 A1    Jan. 19, 2006

(30) Foreign Application Priority Data

Sep. 4, 2002    (EP) .................................. 02292176

(51) Int. Cl.
*G11B 7/00* (2006.01)

(52) U.S. Cl. .............. 369/112.01; 369/118; 369/112.23; 369/94

(58) Field of Classification Search .............. 369/44.23, 369/44.24, 112.1, 112.01, 112.23, 94, 103, 369/112.02, 44.11, 118, 122, 112.22, 121
See application file for complete search history.

(56) References Cited

U.S. PATENT DOCUMENTS 6,009,065 A     12/1999  Glushko et al.
6,992,965 B1 *  1/2006   Glushko et al. ............ 369/103

OTHER PUBLICATIONS

Kenneth Mason; Reduction of Optical Disk Noise by Collection of Scattered Light; Publication, Hampshire, GB; No. 321, 1991; p. 49.

* cited by examiner

*Primary Examiner*—Nabil Hindi
(74) *Attorney, Agent, or Firm*—Michael E. Belk

(57) ABSTRACT

The invention relates to a scanning apparatus for scanning information in an information carrier (16) comprising a plurality of layers for storing data on a material capable of generating an excited radiation when interacting with an exciting beam (13) produced by an exciting source (11). The scanning apparatus comprises an objective lens (15) for projecting the exciting beam in a layer of the carrier and collecting the excited radiation. The scanning apparatus also comprises a detector unit (19) for detecting the excited radiation collected on the objective lens. According to the invention, the exciting beam has a numerical aperture lower than the lens numerical aperture.

19 Claims, 8 Drawing Sheets

SCANNING APPARATUS FOR FLUORESCENT MULTI-LAYER STORAGE

This application is a 371 of PCT1B03/03757 Aug. 22, 2003.

FIELD OF THE INVENTION

The present invention relates to a scanning apparatus for scanning information in an information carrier comprising a plurality of layers for storing data on a material capable of generating an excited radiation when interacting with an exciting beam produced by an exciting source, said apparatus comprising an objective lens for projecting the exciting beam in a layer of the carrier and collecting the excited radiation, said objective lens having a lens numerical aperture, and a detector unit for detecting the excited radiation collected on the objective lens.

The present invention is particularly relevant for an optical disc apparatus for reading and/or recording data from and/or to a fluorescent multi-layer disc.

BACKGROUND OF THE INVENTION

A scanning apparatus for fluorescent optical storage reading is described in U.S. Pat. No. 6,009,065. Information carriers are organized in the form of a multilayer optical disc. The information is deposited or recorded as a sequence of fluorescent and non-fluorescent cells, the fluorescent cells being made of a material capable of generating an excited radiation when interacting with an exciting beam. The layers of the carrier are separated by thick layers, which are transparent to the wavelengths of the exciting beam and the excited radiation. Such a multilayer optical disc comprises a plurality of layers, from 2 to 100 or even more.

The exciting beam is focussed with an objective lens on a layer of the disc. When a fluorescent cell is illuminated by the exciting beam, a fluorescence signal is generated. This fluorescence signal has a wavelength, which is different from the wavelength of the exciting beam, and is detected by a detector unit. The detector unit comprises means for separating the fluorescence signal coming from the in-focus layer from the fluorescence signals coming from the out of focus layers. For example, a confocal pinhole is inserted in front of a photodiode in order to spatially block the fluorescence signal coming from the out-of-focus layers.

FIG. 1 illustrates a scanning apparatus for multilayer optical storage. Such a scanning apparatus comprises an exciting source 11, a collimator lens 12, a dichroic mirror 14, an objective lens 15, an imaging lens 18 and a detecting unit 19. This scanning apparatus is intended for reading a fluorescent multilayer carrier 16.

The exciting source generates an exciting beam 13. The collimator lens 12 is designed for providing a parallel exciting beam. The exciting beam 13 then reaches the dichroic mirror 14 and is directed to the objective lens 15, which focuses this exciting beam 13 on a layer of the carrier 16. The objective lens 15 can be moved up and down in order to focus the exciting beam 13 on the desired layer.

The exciting beam 13 interacts with the layers of the disc, which results in an excited radiation 17. This excited radiation passes through the dichroic mirror and reaches the imaging lens 18, which focuses the excited radiation 17 on the detecting unit 19.

The storage capacity of a layer depends on the area of the focussed exciting beam, i.e. the area of the spot created on a layer when the exciting beam 13 is focussed on this layer. In order to obtain a large storage capacity, a small focussed spot area is required.

Now, the focussed spot area is proportional to $(\lambda/NA)^2$, where $\lambda$ is the wavelength of the exciting beam 13 and NA is the numerical aperture of the exciting beam 13, i.e. the numerical aperture of the objective lens in this case. It thus seems judicious to use an objective lens having the largest possible numerical aperture, in order to obtain a large storage capacity. However, the useable numerical aperture for the objective lens is limited by the presence of aberrations, which occur for the parts of the exciting beam 13 passing through the outer pupil regions of the objective lens. These aberrations strongly increase with the numerical aperture of the objective lens. For example, the third order spherical aberrations increase with $NA^4$. This is a drawback because the aberrations strongly affect the signal detected by the detecting unit 19, leading to an unreliable scanning apparatus. Actually, in multilayer storage, different layers at different positions within the carrier have to be accessed, leading to layer-dependent aberrations, especially spherical aberrations. It is not possible, as in single layer storage, to pre-compensate for this with a single lens.

For this reason, the useable objective lens numerical aperture is limited, in practice to roughly 0.6. Now, another consideration has to be taken into account. The geometric emission characteristic of the excited radiation is not identical with that of the exciting beam, i.e. in an isotropic case, the excited radiation propagates in all directions from the excited fluorescent cells. The excited radiation 17 collected on the objective lens 15 thus corresponds to a small part of the excited radiation induced by the exciting beam, and the smaller the numerical aperture of the objective lens 15, the smaller the part of the excited radiation collected on the objective lens 15.

Therefore, the signal detected by the detecting unit 19, corresponding to the excited radiation collected on the objective lens 15, is low with the useable objective lenses, which have a numerical aperture inferior to 0.6. A low detected signal is a drawback, because it leads to a low signal to noise ratio, and thus to a limited bandwidth and data rate of the scanning apparatus.

SUMMARY OF THE INVENTION

It is an object of the invention to provide a scanning apparatus in which the detected signal corresponding to the excited radiation collected on the objective lens is increased.

To this end, a scanning apparatus according to the invention, as described in the opening paragraph, is characterised in that the exciting beam has a numerical aperture lower than the lens numerical aperture.

If the exciting beam is a parallel beam, the fact that the exciting beam has a numerical aperture lower than the lens numerical aperture means that the exciting beam has a diameter lower than a diameter of the objective lens. If the exciting beam is not a parallel beam, the fact that the exciting beam has a numerical aperture lower than the lens numerical aperture means that the exciting beam covers only a part of the surface of the objective lens.

Therefore, according to the invention, the exciting beam is constructed so that it does not pass through the outer pupil regions of the objective lens. This thus allows an excitation of the fluorescent cells with a low numerical aperture, resulting in low aberrations, and an increase of the detected signal, as the total surface of the objective lens is used to collect the emitted light.

Advantageously, the lens numerical aperture is superior to 0.6. This allows increasing the detected signal, compared to the known scanning apparatuses, where the lens numerical aperture is usually inferior to 0.6.

Preferably, the numerical aperture of the exciting beam is substantially equal to 0.6. This allows scanning multilayer carriers having a storage capacity substantially similar to or higher than the storage capacity of the known multilayer carriers.

In a preferred embodiment, the scanning apparatus further comprises an optical assembly between the exciting source and the objective lens, for decreasing the numerical aperture of the exciting beam. According to this preferred embodiment, various exciting sources might be used in a scanning apparatus according to the invention. Actually, if an exciting source is used which produces an exciting beam having a numerical aperture larger than the desired numerical aperture, the optical assembly produces an exciting beam having the desired numerical aperture.

Advantageously, the optical assembly is a dichroic mirror. As a dichroic mirror is already used in the known scanning apparatuses, this dichroic mirror might be specially designed for decreasing the numerical aperture of the exciting beam. Such a scanning apparatus thus does not require more optical elements than the known scanning apparatuses.

Preferably, the optical assembly is an aperture for reducing a diameter of the exciting beam. This is particularly advantageous when the exciting beam is a parallel beam. Such an aperture is easy to design, and is not bulky.

Advantageously, the exciting source is a laser diode and the optical assembly comprises a collimator lens. Compared to the known scanning apparatuses, only the diameter of the collimator lens has to be changed in order to implement the invention.

Preferably, the optical assembly further comprises a beam expander. This allows using the laser diode and the collimator lens of a known scanning apparatus, and adding only a beam expander in order to decrease the beam diameter and thus the numerical aperture of the exciting beam.

These and other aspects of the invention are apparent from and elucidated with reference to the embodiments described hereinafter.

BRIEF DESCRIPTION OF THE DRAWINGS

The invention will now be described in more detail, by way of example, with reference to the accompanying drawings, in which.

DETAILED DESCRIPTION OF THE INVENTION

Figure 1:
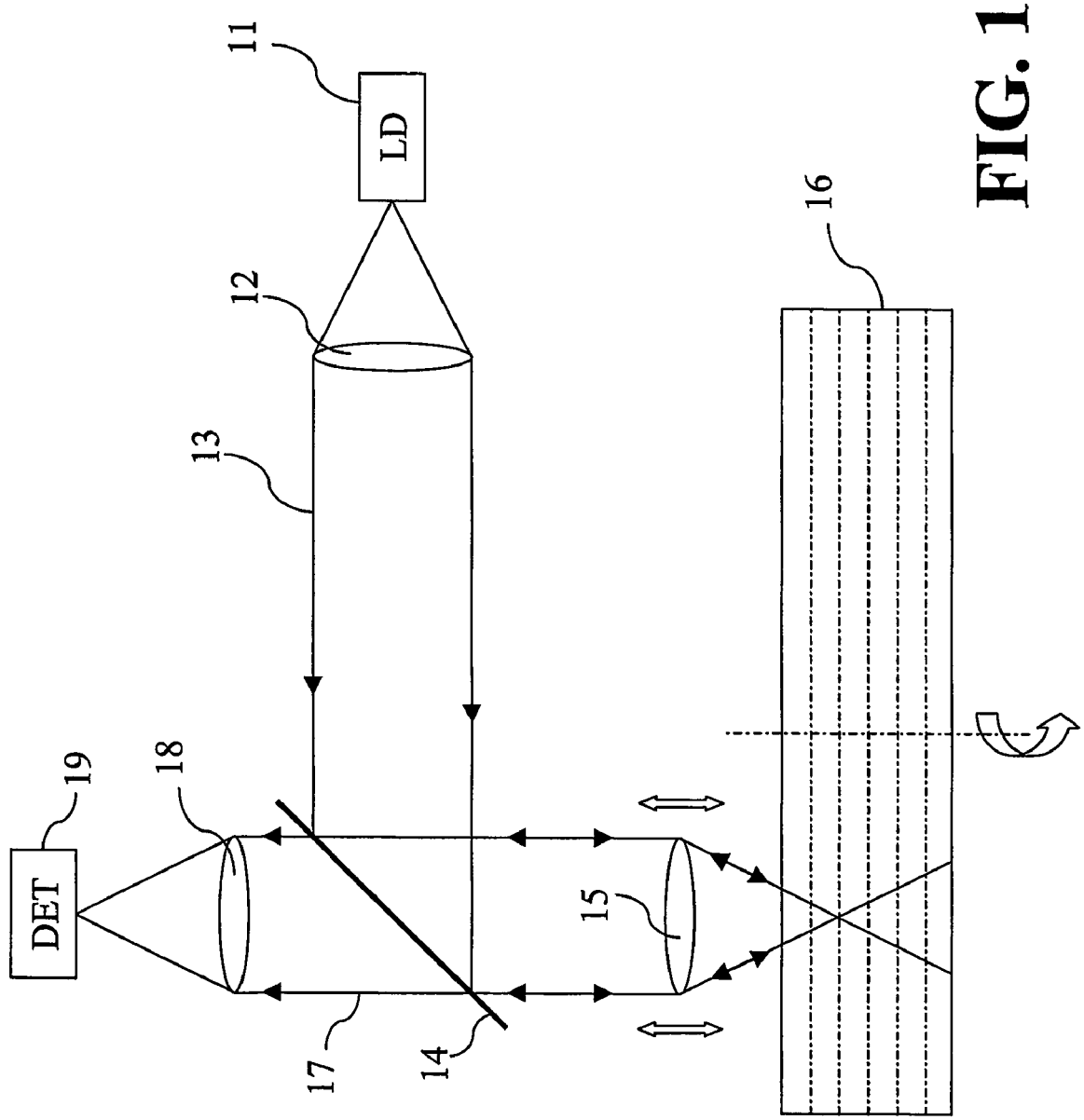
FIG. 1 is a drawing illustrating a scanning apparatus for multilayer optical storage according to the background art.
Figure 2:
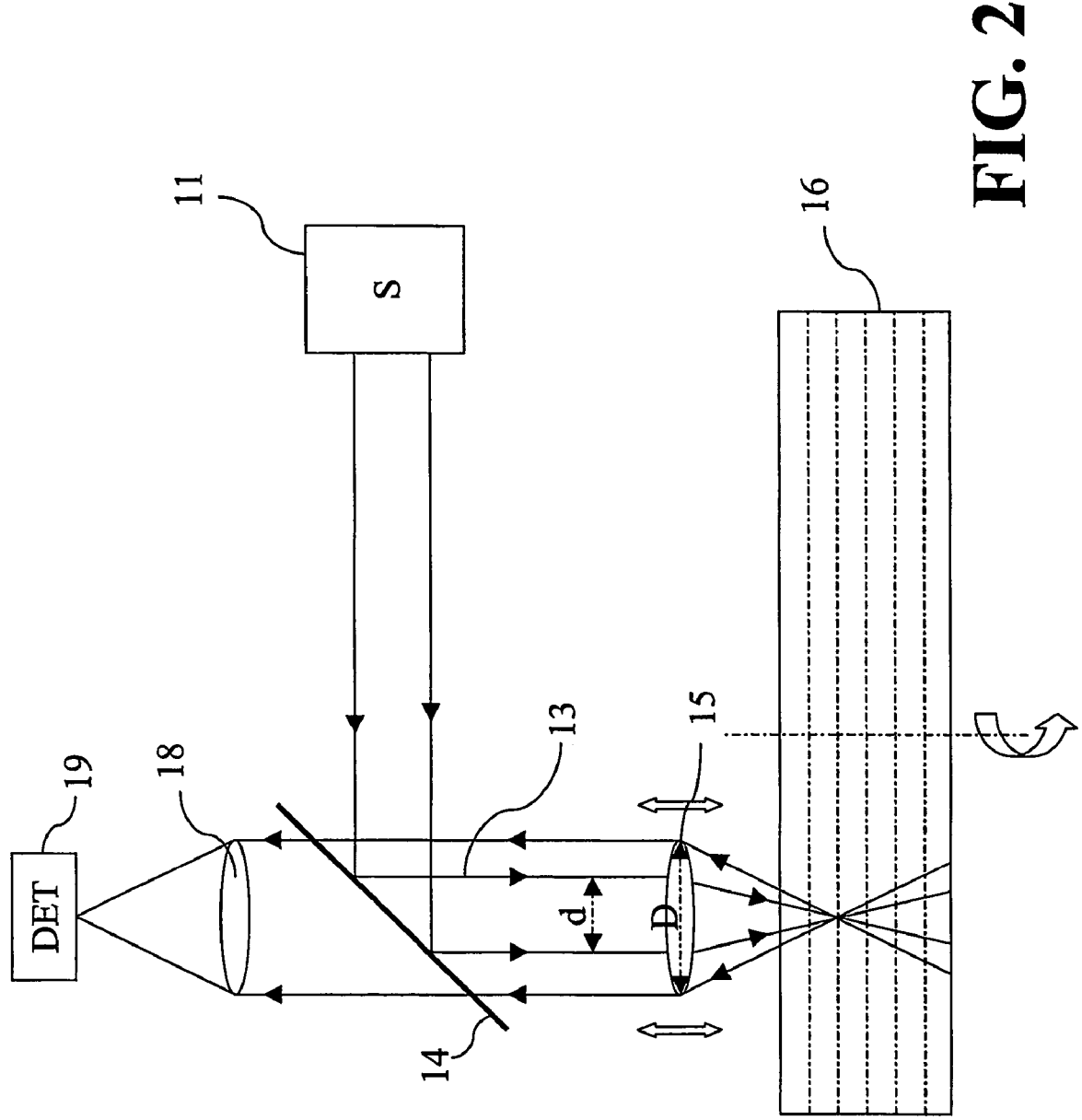
FIG. 2 is a drawing illustrating a scanning apparatus for multilayer optical storage according to the invention.

A scanning apparatus according to the invention is depicted in FIG. 2. Such a scanning apparatus comprises an exciting source 11, a dichroic mirror 14, an objective lens 15, an imaging lens 18 and a detecting unit 19. This scanning apparatus is intended for reading a fluorescent multilayer carrier 16.

In this example, the exciting source 11 is designed so as to produce a parallel beam. The parallel beam produced by the exciting source 11 reaches the dichroic mirror 14, and an exciting beam 13 is produced, which is directed to the objective lens 15, which focuses this exciting beam 13 on a layer of the carrier 16.

The exciting beam 13 has a numerical aperture lower than the numerical aperture of the objective lens 15. In this example, this means that the diameter d of the exciting beam is smaller than the diameter D of the objective lens.

For example, the numerical aperture of the exciting beam 13 is 0.6, and the numerical aperture of the objective lens is 0.8. For an objective lens having a focal length of 1.765 millimetres, this corresponds to a lens diameter D of 2.82 millimetres and an exciting beam diameter d of 2.12 millimetres.

In the known scanning apparatuses for multilayer systems, it is not practical to use an objective lens having a numerical aperture of 0.8, because this results in an exciting beam having a numerical aperture of 0.8, which leads to optical aberrations, which are different for every addressed layer. Thus, an objective lens having a numerical aperture inferior to 0.6 is usually used in the known scanning apparatuses. As a consequence, the objective lens 15 only collects a small part of the excited radiation induced by the exciting beam. Actually, it can be shown that the part of excited radiation induced by the exciting beam which is collected on the objective lens 15 is about $(NA/2n)^2$, where n is the refractive index of the fluorescent multilayer carrier 16. For an objective lens of 0.6 and a refractive index of 1.5, only 4% of the excited radiation induced by the exciting beam is collected on the objective lens 15.

In the above-mentioned example, where the numerical aperture of the exciting beam 13 is 0.6 and the numerical aperture of the objective lens is 0.8, 7.1% of the excited radiation induced by the exciting beam is collected on the objective lens 15. This large increase of the excited radiation collected on the objective lens 15 leads to a large increase of the signal detected by the detecting unit 19, and thus to a more reliable scanning apparatus. Furthermore, as the numerical aperture of the exciting beam 13 is the same, in this example, as in the known scanning apparatuses, the invention does not introduce additional optical aberrations, and the storage capacity of the fluorescent multilayer carrier 16 is not reduced.

Of course, other numerical apertures might be used in a scanning apparatus according to the invention. For example, it is possible to choose an exciting beam having a numerical aperture between 0.4 and 0.7, and an objective lens having a numerical aperture between 0.5 and 1. The choice of the numerical apertures depends, inter alia, on the desired level of cross-talk. The cross-talk represents the part of the detected signal which corresponds to out-of-focus layers.

Actually, there is a trade-off between the increase of the excited radiation collected on the objective lens 15 and a decrease of the detected signal on the detecting unit 19, due to the limited size of the detecting unit 19, because the aberrations present in the excited radiation increase the size of the focussed spot detected by the detecting unit 19, which size is determined by the desired level of cross-talk. Thus, the choice of the numerical apertures depends on the desired level of cross-talk.

Figure 3:
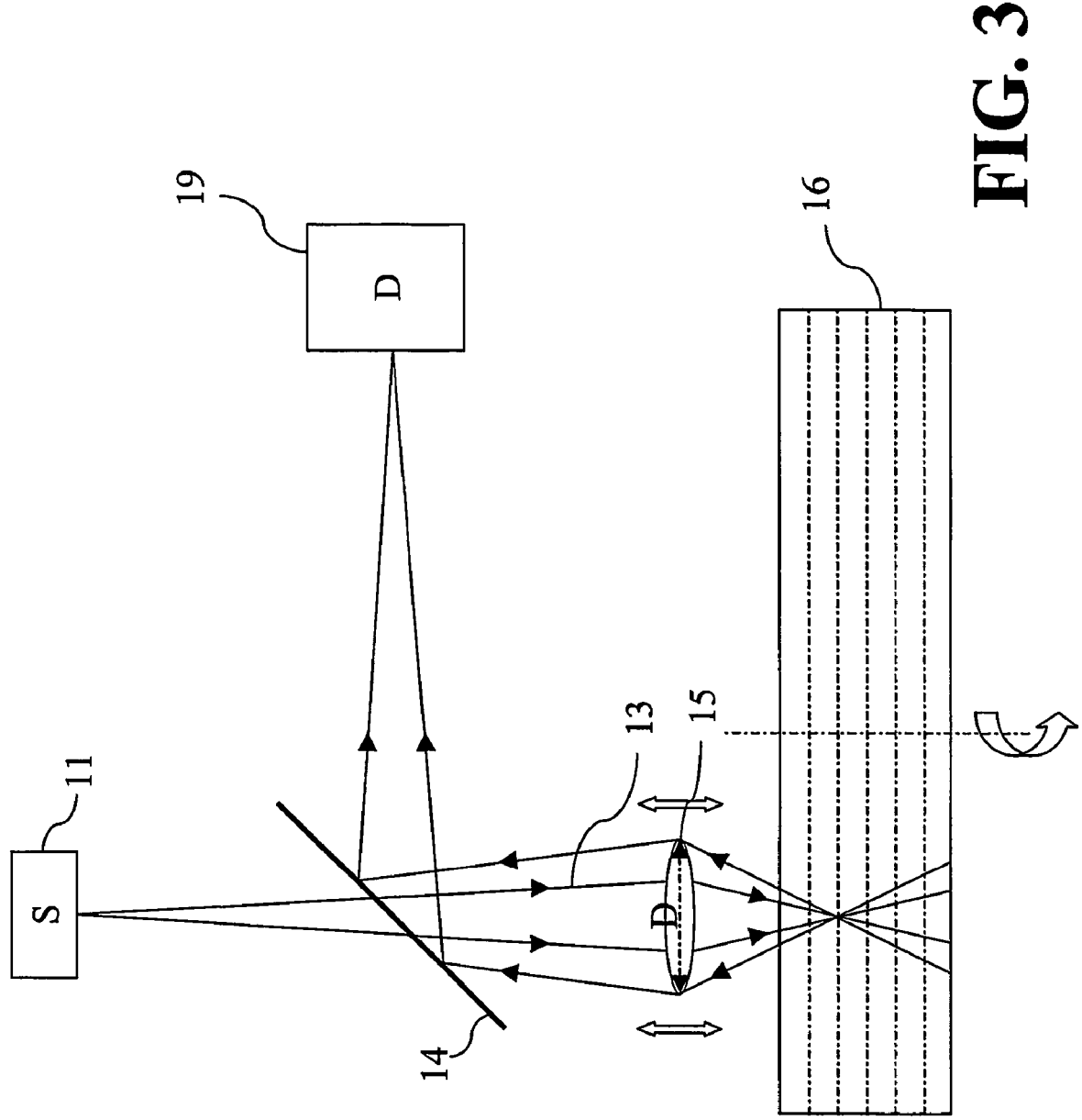
FIG. 3 is a drawing illustrating another scanning apparatus for multilayer optical storage according to the invention.

Another scanning apparatus according to the invention is depicted in FIG. 3. Such a scanning apparatus comprises an exciting source 11, a dichroic mirror 14, an objective lens 15 and a detecting unit 19. This scanning apparatus is intended for reading a fluorescent multilayer carrier 16.

In this example, the exciting source 11 produces a diverging beam, which passes through the dichroic mirror 14 so as to produce the exciting beam 13. The exciting source is, for example, a laser diode. The exciting beam 13 is thus a diverging beam, and the objective lens 15 is designed for focussing the exciting beam 13 on the desired layer of the fluorescent multilayer carrier 16. In this example, the fact that the numerical aperture of the exciting beam 13 is lower than the numerical aperture of the objective lens 15 means that the exciting beam 13 covers only a part of the surface of the objective lens 15. In other words, the intersection between the exciting beam 13 and the central disc of the objective lens 15 is a disc the diameter of which is smaller than the diameter D of the objective lens 15.

Figure 4:
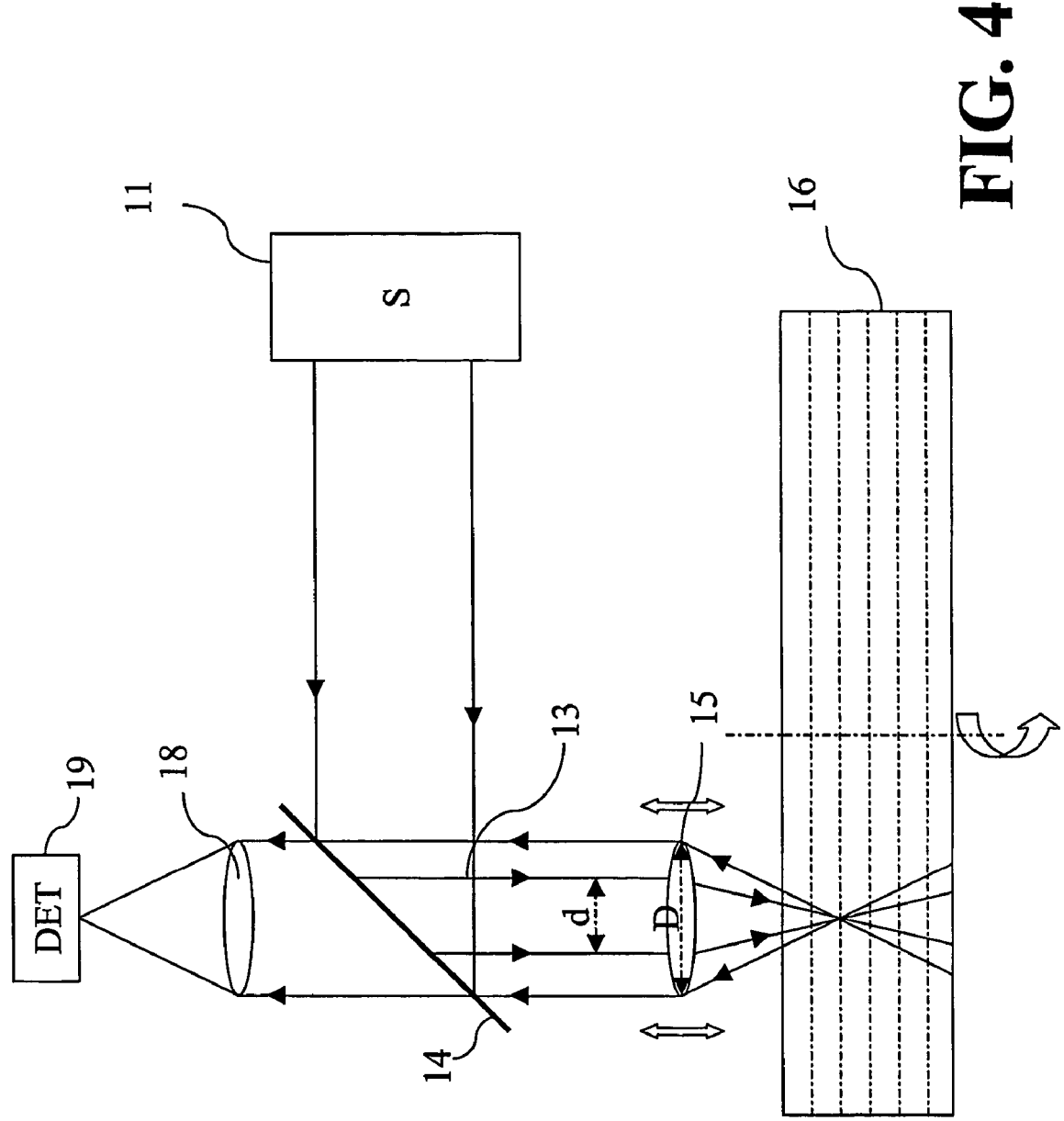
FIG. 4 is a drawing illustrating a scanning apparatus for multilayer optical storage according to the invention, wherein the dichroic mirror is used for decreasing the numerical aperture of the exciting beam.

FIG. 4 illustrates a scanning apparatus wherein the dichroic mirror is used for decreasing the numerical aperture of the exciting beam. In this scanning apparatus, the exciting source 11 produces a parallel beam the diameter of which is larger than the diameter of the desired exciting beam according to the invention. The dichroic mirror 14 is used for producing an exciting beam 13 having the desired numerical aperture.

In order to produce an exciting beam 13 having a smaller diameter than the diameter of the parallel beam produced by the exciting source 11, the dichroic mirror 14 is designed for reflecting only a part of the parallel beam coming from the exciting source 11, which part corresponds to the exciting beam 13. This can be achieved by an appropriate treatment of the surfaces of the dichroic mirror 14. Conversely, the dichroic mirror 14 is designed for leaving the beam corresponding to the excited radiation unchanged, so that all of the excited radiation collected on the objective lens 15 can be detected by the detecting unit 19.

Figure 5:
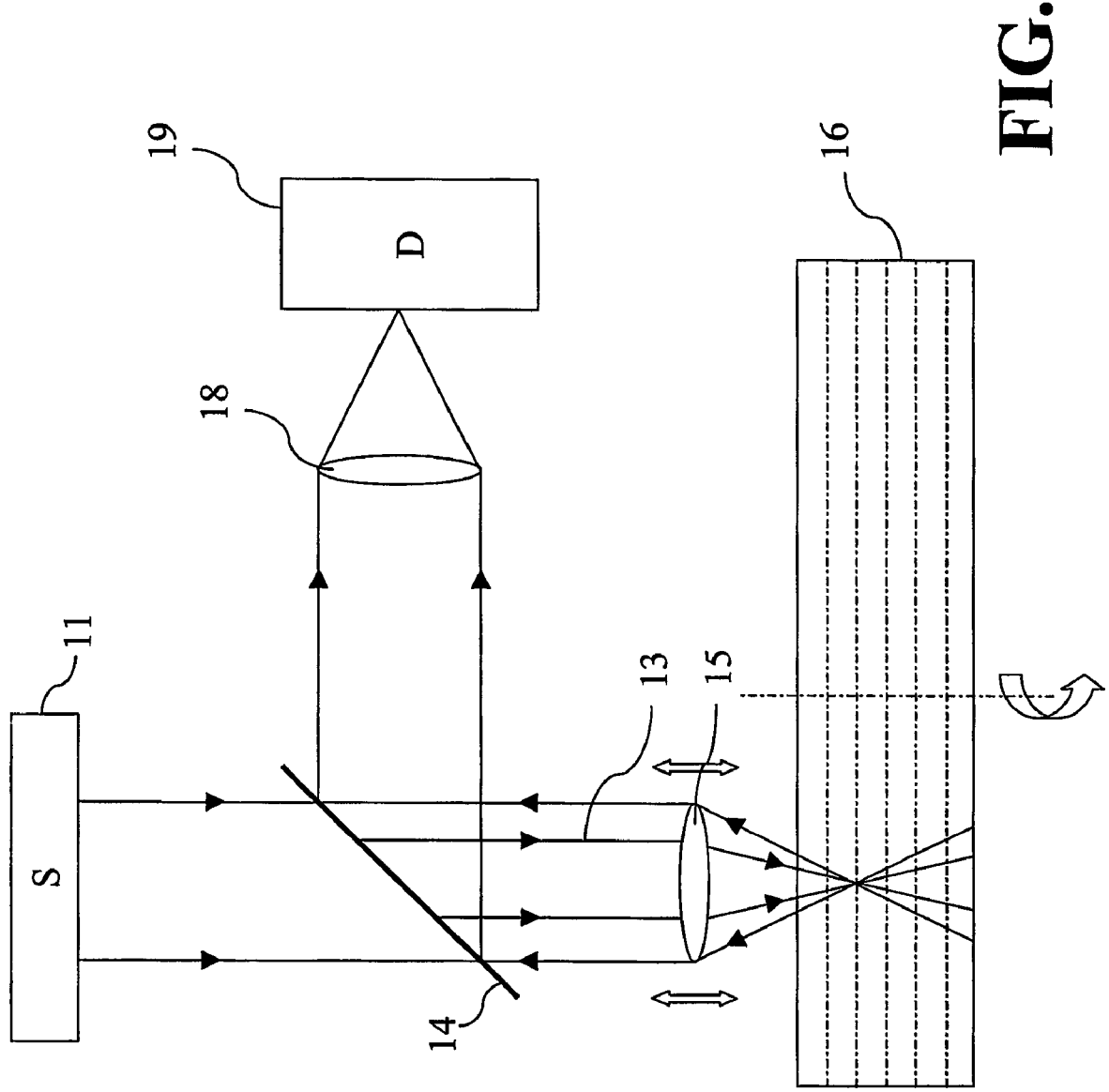
FIG. 5 is a drawing illustrating another scanning apparatus for multilayer optical storage according to the invention, wherein the dichroic mirror is used for decreasing the numerical aperture of the exciting beam

FIG. 5 illustrates another scanning apparatus, wherein the dichroic mirror is used for decreasing the numerical aperture of the exciting beam. In this scanning apparatus, the exciting source 11 produces a parallel beam the diameter of which is larger than the diameter of the exciting beam according to the invention.

The dichroic mirror 14 is designed so that only a part of the parallel beam coming from the exciting source 11 can pass through the dichroic mirror 14, which part corresponds to the exciting beam 13. This can be achieved by an appropriate treatment of the surfaces of the dichroic mirror 14. Conversely, the dichroic mirror 14 is designed for reflecting the whole beam corresponding to the excited radiation, so that all of the excited radiation collected on the objective lens 15 can be detected by the detecting unit 19.

Figure 6:
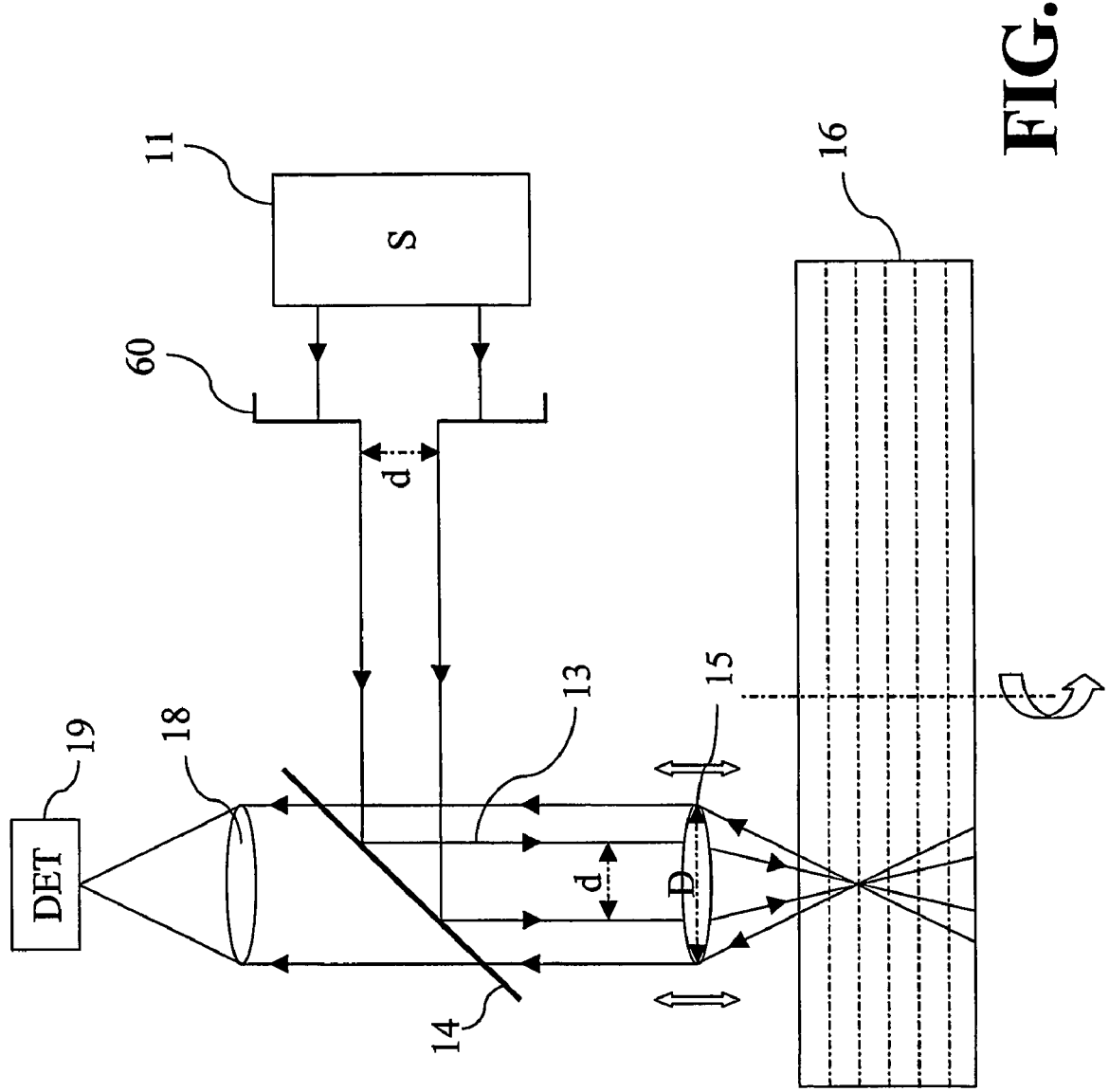
FIG. 6 is a drawing illustrating a scanning apparatus for multilayer optical storage according to the invention, wherein an aperture is used for decreasing the numerical aperture of the exciting beam.

FIG. 6 illustrates a scanning apparatus wherein an aperture is used for decreasing the numerical aperture of the exciting beam. In this scanning apparatus, the exciting source 11 produces a parallel beam the diameter of which is larger than the diameter of the desired exciting beam according to the invention. An aperture 60 is used in order to produce the exciting beam 13.

This aperture 60 is designed for stopping the parallel beam produced by the exciting beam 11, except for a part having a diameter d, which part corresponds to the exciting beam 13. The aperture is made from a material capable of absorbing the beam produced by the source 11, and comprises a hole having a diameter equal to the diameter d of the exciting beam 13.

Figure 7:
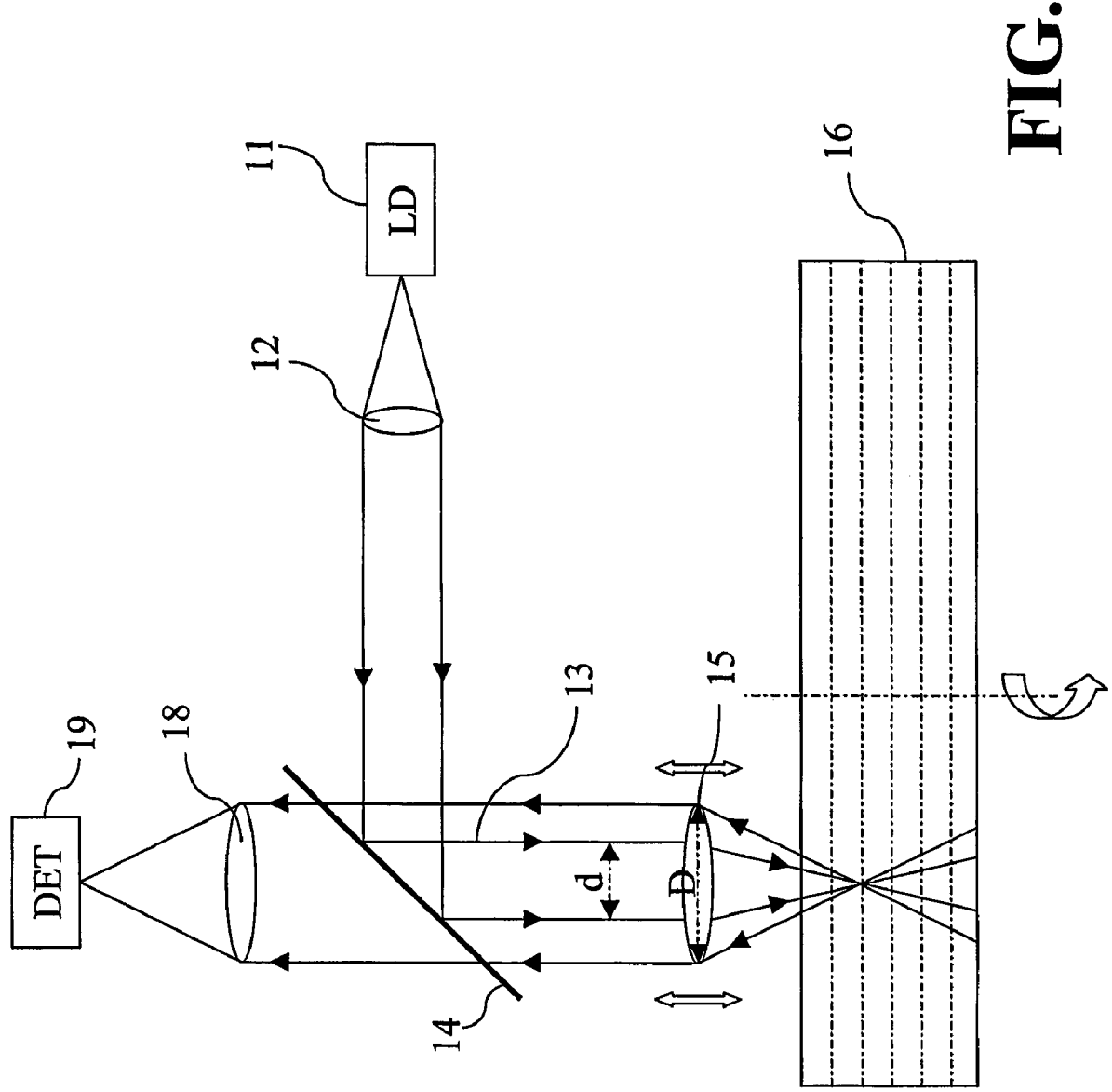
FIG. 7 is a drawing illustrating a scanning apparatus for multilayer optical storage according to the invention, wherein a collimator lens is used for decreasing the numerical aperture of the exciting beam.

FIG. 7 illustrates a scanning apparatus wherein a collimator lens 12 is used for decreasing the numerical aperture of the exciting beam. In this example, the exciting source 11 is a laser diode, which is placed at the focal point of a collimator lens 12. The diameter of the collimator lens 12 is equal to the diameter of the desired exciting beam 13. The laser diode 11 produces a diverging beam, which is converted to a parallel beam by the collimator lens 12. This parallel beam is then reflected by the dichroic mirror 14, which produces the exciting beam 13 having the desired numerical aperture.

Figure 8:
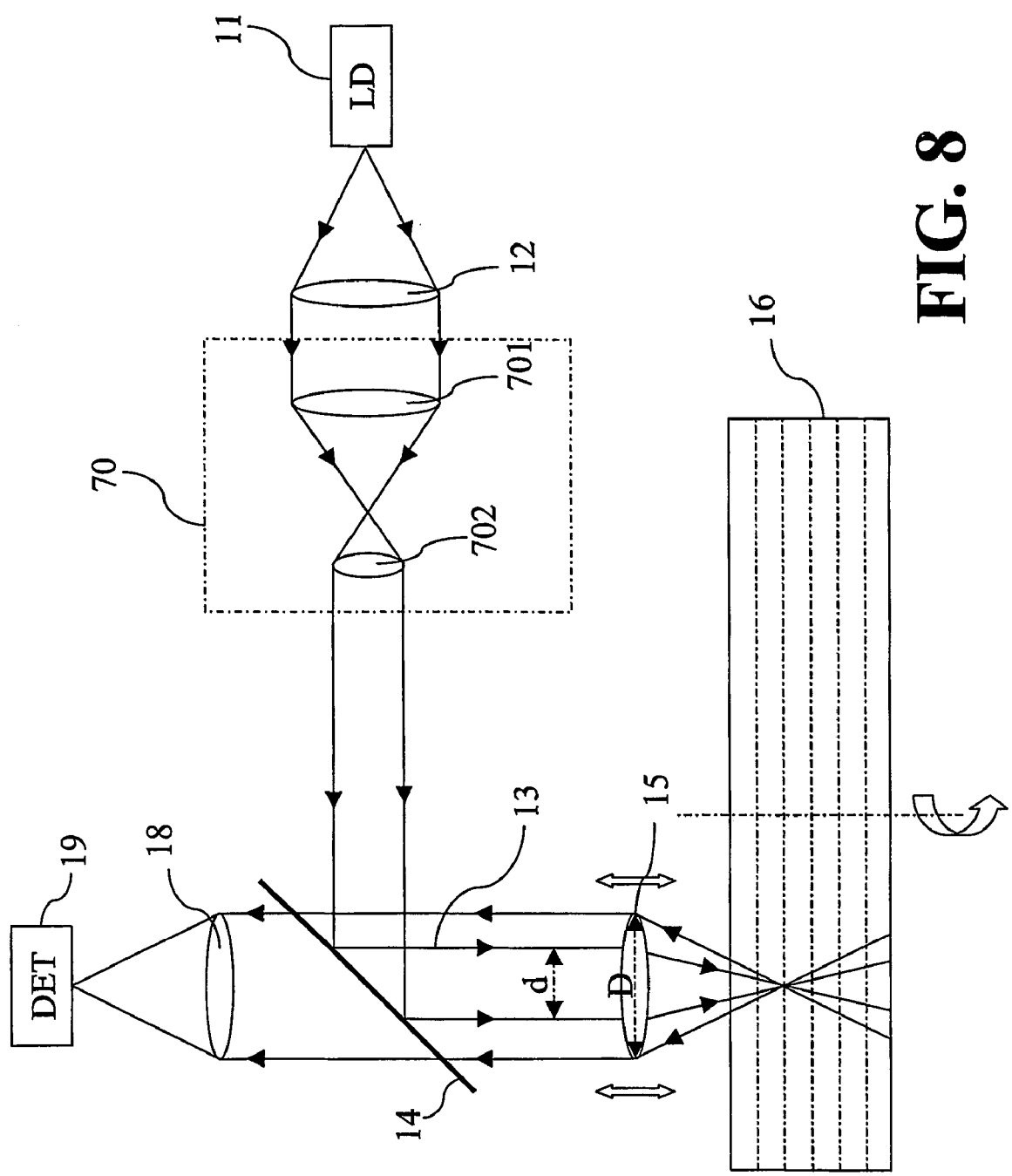
FIG. 8 is a drawing illustrating a scanning apparatus for multilayer optical storage according to the invention, wherein a beam expander is used for decreasing the numerical aperture of the exciting beam.

FIG. 8 illustrates a scanning apparatus, wherein a beam expander 70 is used for decreasing the numerical aperture of the exciting beam. This beam expander 70 comprises a first beam expander lens 701 and a second beam expander lens 702. In this example, the exciting source 11 is a laser diode, which is placed at the focal point of a collimator lens 12. The diameter of the collimator lens 12 is superior to the diameter of the desired exciting beam 13. The laser diode 11 produces a diverging beam, which is converted to a parallel beam by the collimator lens 12. This parallel beam thus has a diameter superior to the diameter of the desired exciting beam 13.

The beam expander is used for producing a beam having a smaller diameter from a beam having a larger diameter. The first beam expander lens 701 has the same diameter as the lens collimator 12. The second beam expander lens 702 has a diameter equal to the diameter d of the desired exciting beam 13. The first and second beam expander lenses 701 and 702 are placed so that their focal points are merged. A parallel beam is thus obtained the diameter of which is equal to the diameter d of the desired exciting beam.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A scanning apparatus for scanning information in an information carrier comprising a plurality of layers for storing data on a material capable of generating an excited radiation when interacting with an exciting beam produced by an exciting source, said apparatus comprising:

an objective lens configured to project the exciting beam in a layer of the carrier and configured to collect the excited radiation, said objective lens having an objective lens numerical aperture;

a dichroic mirror arranged between the exciting source and the lens, and arranged to reflect the exciting beam towards the objective lens; and a detector unit configured to detect the excited radiation collected on the objective lens, wherein the reflected exciting beam has a numerical aperture lower than the objective lens numerical aperture.

2. The scanning apparatus of claim 1, wherein the objective lens numerical aperture is between 0.5 and 1.

3. The scanning apparatus of claim 2, wherein the numerical aperture of the exciting beam is between 0.4 and 0.7.

4. The scanning apparatus of claim 1, further comprising an optical assembly arranged between the exciting source and the dichroic mirror, and configured to decrease the numerical aperture of the exciting beam.

5. The scanning apparatus of claim 1, wherein the dichroic mirror is configured to decrease the numerical aperture of the reflected exciting beam.

6. The scanning apparatus of claim 4, wherein the optical assembly comprises an aperture configured to reduce a diameter of the exciting beam.

7. The scanning apparatus of claim 4, wherein the exciting source is a laser diode and the optical assembly comprises a collimator lens.

8. The scanning apparatus of claim 6, wherein the optical assembly further comprises a beam expander.

9. The scanning apparatus of claim 1, wherein the exciting beam incident on the dichroic mirror has a numerical aperture lower than the objective lens numerical aperture.

10. The scanning apparatus of claim 9, further comprising an optical assembly arranged between the exciting source and the dichroic mirror, and configured to decrease the numerical aperture of the exciting beam.

11. A scanning apparatus for scanning information an an information carrier comprising a plurality of layers for storing data on a material capable of generating an excited radiation when interacting with an exciting beam produced by an exciting source, said apparatus comprising:
    an objective lens configured to project the exciting beam in a layer of the carrier and configured to collect the excited radiation, said objective lens having an objective lens numerical aperture;
    a dichroic mirror arranged between the exciting source and the lens, and configured to transmit the exciting beam towards the objective lens; and
    a detector unit configured to detect the excited radiation collected on the objective lens, wherein the transmitted exciting beam has a numerical aperture lower than the objective lens numerical aperture, and wherein the dichroic mirror is configured to transmit over an entire surface of the dichroic mirror, the excited radiation collected on the objective lens.

12. The scanning apparatus of claim 11, further comprising an optical assembly arranged between the exciting source and the dichroic mirror, and configured to decrease the numerical aperture of the exciting beam.

13. The scanning apparatus of claim 12, wherein the optical assembly comprises an aperture configured to reduce a diameter of the exciting beam.

14. The scanning apparatus of claim 12, wherein, the exciting source is a laser diode and the optical assembly comprises a collimator lens.

15. The scanning apparatus of claim 13, wherein the optical assembly further comprises a beam expander.

16. The scanning apparatus of claim 11, wherein the exciting beam incident on the dichroic mirror has a numerical aperture lower than the objective lens numerical aperture.

17. The scanning apparatus of claim 11, wherein the exciting beam incident on the dichroic mirror is a diverging beam.

18. The scanning apparatus of claim 11, wherein the dichroic mirror is configured to reflect over the entire surface of the dichroic mirror, the excited radiation collected on the objective lens.

19. The scanning apparatus of claim 11, wherein the dichroic mirror is configured to reflect over an entire further surface of the dichroic mirror, the exciting beam towards the objective lens.

* * * * *